(12) United States Patent
Iwakura et al.

(10) Patent No.: US 10,647,044 B2
(45) Date of Patent: May 12, 2020

(54) INJECTION MOLDING MACHINE

(71) Applicant: FANUC CORPORATION, Yamanashi (JP)

(72) Inventors: Jun Iwakura, Yamanashi-ken (JP); Junpei Maruyama, Yamanashi-ken (JP); Tatsuhiro Uchiyama, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 259 days.

(21) Appl. No.: 15/591,404

(22) Filed: May 10, 2017

(65) Prior Publication Data
US 2017/0334116 A1    Nov. 23, 2017

(30) Foreign Application Priority Data

May 18, 2016    (JP) ................................ 2016-099427

(51) Int. Cl.
*B29C 45/84*    (2006.01)
*B29C 45/17*    (2006.01)
*B29C 45/76*    (2006.01)

(52) U.S. Cl.
CPC .............. *B29C 45/84* (2013.01); *B29C 45/17* (2013.01); *B29C 45/76* (2013.01);
(Continued)

(58) Field of Classification Search
CPC ......... B29C 45/84; B29C 45/17; B29C 45/76; B29C 2045/1792; B29C 2945/76598;
(Continued)

(56) References Cited

U.S. PATENT DOCUMENTS

2010/0287841 A1    11/2010    Ono et al.
2014/0021805 A1*    1/2014    Koyama ................ F16P 3/005
                                                                      307/328

FOREIGN PATENT DOCUMENTS

CN              2559474 Y      7/2003
CN            201941146 U      8/2011
(Continued)

OTHER PUBLICATIONS

English Abstract for Japanese Publication No. 2009-166352 A, published Jul. 30, 2009, 2 pgs.
(Continued)

*Primary Examiner* — Robert J Grun
*Assistant Examiner* — Michael Robinson
(74) *Attorney, Agent, or Firm* — Fredrikson & Byron, P.A.

(57) ABSTRACT

An injection molding machine, which includes a safety door that can be opened and closed, is further equipped with a servo motor configured to open and close the safety door, a presence detector configured to detect whether or not an operator or object is present within a door operating space of the safety door or within a predetermined vicinal area of the safety door including the door operating space, and a controller configured to control the servo motor with a reference control amount in order to perform a closing operation of the safety door, and during a time it is detected by the presence detector that an operator or object is present, to cause a control amount that controls the servo motor in order to perform the closing operation of the safety door to decrease from the reference control amount.

7 Claims, 8 Drawing Sheets

(52) U.S. Cl.
CPC ............ *B29C 2045/1785* (2013.01); *B29C 2045/1792* (2013.01); *B29C 2045/1794* (2013.01); *B29C 2945/76167* (2013.01); *B29C 2945/76237* (2013.01); *B29C 2945/76505* (2013.01); *B29C 2945/76598* (2013.01); *B29C 2945/76715* (2013.01)

(58) Field of Classification Search
CPC .. B29C 2945/76167; B29C 2045/1794; B29C 2945/76505; B29C 2945/76715; B29C 2945/76237; B29C 2045/1785
See application file for complete search history.

(56) References Cited

FOREIGN PATENT DOCUMENTS

| | | |
|---|---|---|
| CN | 104589607 A | 5/2015 |
| DE | 10112200 A1 | 10/2002 |
| DE | 102012004018 A1 | 9/2012 |
| DE | 102014013954 A1 | 4/2015 |
| JP | 929809 A | 2/1997 |
| JP | 2007230113 A | 9/2007 |
| JP | 2009166352 A | 7/2009 |
| JP | 201419144 A | 2/2014 |

OTHER PUBLICATIONS

Untranslated Decision to Grant a Patent mailed by Japan Patent Office (JPO) for Application No. JP 2016-099427, dated Sep. 4, 2018, 3 pages.

English Machine Translation of Decision to Grant a Patent mailed by Japan Patent Office (JPO) for Application No. JP 2016-099427, dated Sep. 4, 2018, 3 pages.

Untranslated Notification of Reasons for Refusal mailed by Japan Patent Office (JPO) for Application No. JP 2016-099427, dated Jun. 26, 2018, 3 pages.

English Machine Translation of Notification of Reasons for Refusal mailed by Japan Patent Office (JPO) for Application No. JP 2016-099427, dated Jun. 26, 2018, 3 page.

English Abstract and Machine Translation for Japanese Publication No. 09-029809 A, published Feb. 4, 1997, 6 pgs.

English Abstract and Machine Translation for Chinese Publication No. 104589607 A, published May 6, 2015, 5 pgs.

English Abstract and Machine Translation for Japanese Publication No. 2014-019144 A, published Feb. 3, 2014, 15 pgs.

English Abstract and Machine Translation for Chinese Publication No. 201941146 U, published Aug. 24, 2011, 9 pgs.

English Abstract and Machine Translation for Chinese Publication No. 2559474 Y, published Jul. 9, 2003, 10 pgs.

English Abstract and Machine Translation for Japanese Publication No. 2007-230113 A, published Sep. 13, 2007, 15 pgs.

English Abstract and Machine Translation of German Publication No. 102014013954 A1, published Apr. 16, 2015, 15 pgs.

English Abstract and Machine Translation of German Publication No. 102012004018 A1, published Sep. 20, 2012, 17 pgs.

English Abstract and Machine Translation of German Publication No. 10112200 A1, published Oct, 2, 2002, 10 pgs.

\* cited by examiner

INJECTION MOLDING MACHINE

CROSS-REFERENCE TO RELATED APPLICATION

This application is based upon and claims the benefit of priority from Japanese Patent Application No. 2016-099427 filed on May 18, 2016, the contents of which are incorporated herein by reference.

BACKGROUND OF THE INVENTION

Field of the Invention

The present invention relates to an injection molding machine having a safety door that can be opened and closed.

Description of the Related Art

Conventionally, a clamping unit of an injection molding machine is covered by a cover member having a safety door that is capable of being opened and closed. By the safety door, it is possible to prevent a movable portion such as a mold or the like from coming into contact with a person, and to enable the removal of molded articles or exchange of the mold. However, manual opening and closing of the safety door places a large burden on the operator. For this reason, there are situations in which an automatic opening and closing device for automatically opening and closing the safety door is provided in the injection molding machine. In particular, there is a high demand for an automatic opening and closing device for a safety door in order to enable opening and closing of large and heavy safety doors, or for carrying out molding with a short molding cycle time.

In Japanese Laid-Open Patent Publication No. 2009-166352, an automatic opening and closing device for automatically opening and closing a safety door is disclosed, which is constituted by an electric motor capable of performing a feedback control, and a rotary linear motion conversion mechanism. In accordance therewith, it is possible to arbitrarily set an opening position and an opening and closing speed pattern for the safety door, as well as to accurately control the safety door. Further, during a closing operation, if the safety door comes into contact with an operator or an obstacle, such an occurrence can be detected by a torque load of the electric motor.

SUMMARY OF THE INVENTION

In Japanese Laid-Open Patent Publication No. 2009-166352, it is disclosed that during automatically closing of the safety door, when it is detected that the safety door has come into contact with a person or obstacle, the safety door is temporarily stopped. However, since the safety door is temporarily stopped only after the safety door comes into contact with the person or obstacle, it is impossible to prevent contact between the safety door and the person or obstacle. Therefore, safety is inferior, and there are also cases in which the safety door or obstacle becomes damaged.

Thus, the present invention has the object of providing an injection molding machine that prevents contact between a safety door and an operator or object during closure of the safety door.

An aspect of the present invention is characterized by an injection molding machine having a safety door that can be opened and closed, including a door driving unit configured to open and close the safety door, a presence detector configured to detect whether or not an operator or object is present within a door operating space of the safety door, or within a predetermined vicinal area of the safety door including the door operating space, and a controller configured to control the door driving unit with a reference control amount in order to perform a closing operation of the safety door, and during a time it is detected by the presence detector that an operator or object is present, cause a control amount that controls the door driving unit in order to perform the closing operation of the safety door to decrease from the reference control amount.

In accordance with such a configuration, it is possible to prevent contact from occurring between the safety door and an operator or object during closure of the safety door of the injection molding machine. Consequently, safety of the operator can be enhanced, and damage to the safety door or the object can be prevented.

In the injection molding machine according to the aspect of the present invention, during the time it is detected by the presence detector that an operator or object is present, the controller may decrease the control amount applied with respect to the door driving unit, so as to perform at least one from among temporarily stopping the closing operation of the safety door, decreasing a closing speed of the safety door, and decreasing a closing driving force of the safety door. In accordance with this feature, it is possible to prevent contact from occurring between the safety door and an operator or object during closure of the safety door of the injection molding machine.

In the injection molding machine according to the aspect of the present invention, during the time it is detected by the presence detector that an operator or object is present within the door operating space, the controller may temporarily stop the closing operation of the safety door. In accordance with this feature, it is possible to prevent in advance contact between the safety door and an operator or object during closure of the safety door of the injection molding machine.

In the injection molding machine according to the aspect of the present invention, during a time it is detected by the presence detector that an operator or object is present within the vicinal area outside of the door operating space, the controller may perform the closing operation of the safety door by decreasing at least one of the closing speed of the safety door and the closing driving force of the safety door. In accordance with this feature, it is possible to reliably prevent in advance contact between the safety door and an operator or object during closure of the safety door of the injection molding machine.

In the injection molding machine according to the aspect of the present invention, the controller may increase a degree of reduction in at least one of the closing speed of the safety door and the closing driving force of the safety door, as the distance from the door operating space to the operator or the object residing within the vicinal area outside of the door operating space becomes shorter. In accordance with this feature, it is possible to more reliably prevent in advance contact between the safety door and an operator or object during closure of the safety door of the injection molding machine.

In the injection molding machine according to the aspect of the present invention, the controller may initiate the closing operation of the safety door in the case that a door closing command is transmitted thereto from an external device.

In the injection molding machine according to the aspect of the present invention, the external device may be a first operating device configured to output the door closing command in accordance with an operation of the operator, or a robot controller configured to control a robot configured to operate in cooperation with the injection molding machine.

In the injection molding machine according to the aspect of the present invention, the presence detector may include at least one from among a light curtain configured to detect whether or not an operator or object is present within the door operating space, an area sensor configured to detect whether or not an operator or object is present within the vicinal area, and a second operating device disposed at a position distanced from the door operating space, and configured to detect whether or not an operator or object is present within the door operating space depending on whether or not an operation is performed by an operator. In accordance with this feature, it is possible to detect with high accuracy whether or not an operator or object exists within the door operating space of the safety door, or within the predetermined vicinal area of the safety door including the door operating space.

In the injection molding machine according to the aspect of the present invention, the second operating device may detect that an operator or object is not present within the door operating space, in the event that the second operating device is operated with both hands simultaneously by an operator.

According to the present invention, it is possible to prevent contact from occurring between the safety door and an operator or object during closure of the safety door of the injection molding machine. Consequently, safety of the operator can be enhanced, and damage to the safety door or the object can be prevented.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

A preferred embodiment of an injection molding machine according to the present invention will be presented and described in detail below with reference to the accompanying drawings.

Figure 1:
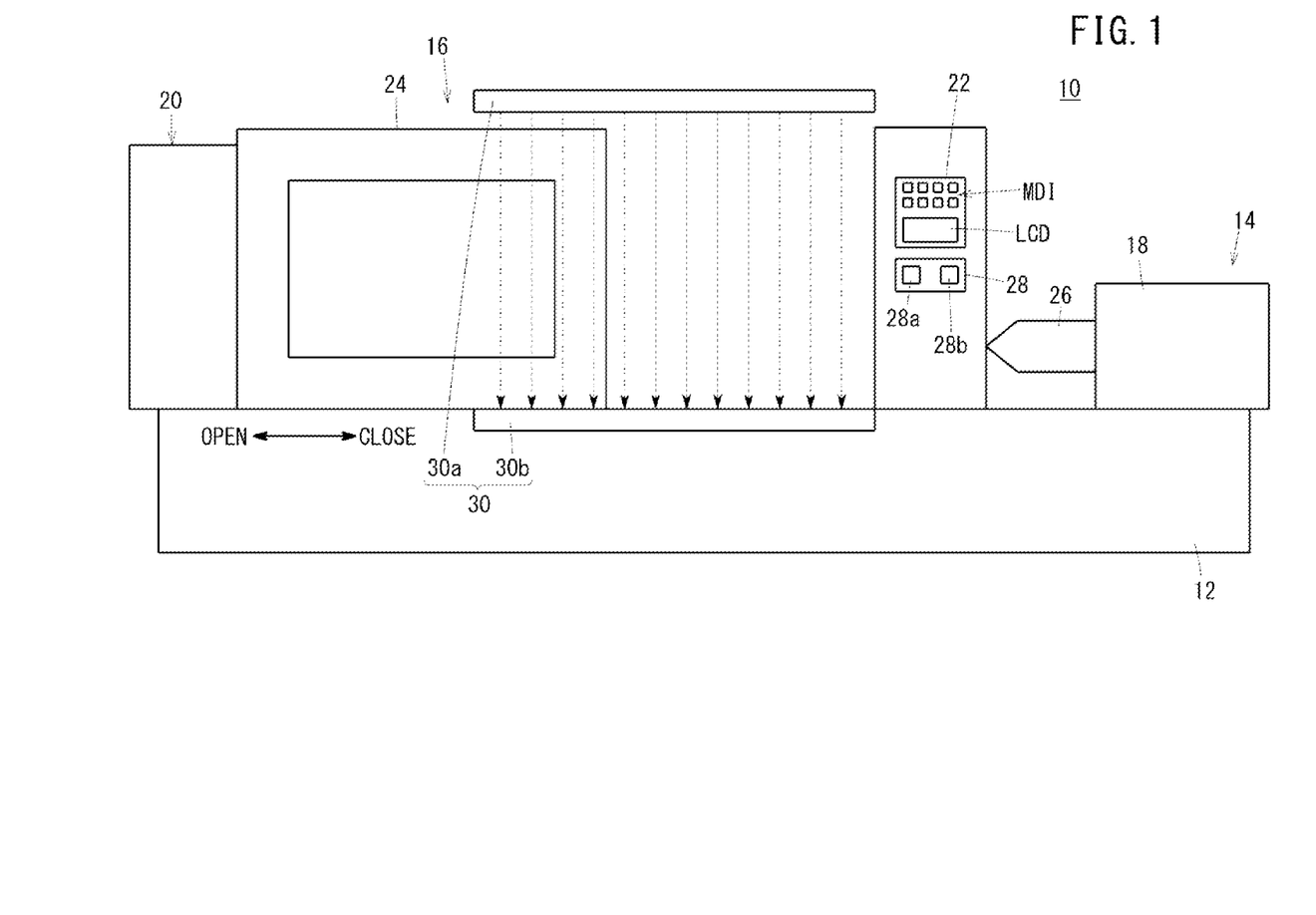
FIG. 1 is a schematic view showing the external configuration of an injection molding machine according to an embodiment of the present invention.

FIG. 1 is a schematic view showing the external configuration of an injection molding machine 10. The injection molding machine 10 comprises a machine base 12, an injection unit 14, and a clamping unit 16, which are arranged on the machine base 12. Note that, in FIG. 1, the clamping unit 16 is illustrated in an exaggerated and enlarged scale.

In the injection molding machine 10, there are provided a cover member 18 that covers at least a portion of the injection unit 14, and a cover member 20 that covers at least a portion of the clamping unit 16. The cover members 18, 20 serve to prevent at least an operator who stands in front of an operation panel 22 from contacting unillustrated movable portions of the injection molding machine 10. The cover member 20 is provided with a safety door 24 that can be opened and closed. By opening the safety door 24, it is possible to visually recognize from the exterior the movable portion of the clamping unit 16 (for example, a mold that can be opened and closed). In the case that the movable portion of the injection molding machine 10 is moving, by moving the safety door 24 in a closing direction and closing the safety door 24, contact between the movable portion of the injection molding machine 10 and the operator is prevented. Further, in the case of inserting a member into the mold in order to perform insert molding, or in the case of removing a molded article from the mold, the safety door 24 is moved in an opening direction and the safety door 24 is opened, whereby the mold is exposed.

The injection unit 14 introduces a resin material from an injection cylinder 26 into a cavity of the mold. Consequently, molding of a molded article is carried out. The operation panel 22 is mounted on a surface of the cover member 20. The attachment position of the operation panel 22 is substantially in the center in a direction of alignment between the injection unit 14 and the clamping unit 16. The operation panel 22 is mounted on the cover member 20 more on the side of the injection unit 14 than the safety door 24.

The operation panel 22 includes a liquid crystal display unit LCD and a manual input unit MDI. By an operator operating the manual input unit MDI of the operation panel 22, it is possible to perform various settings such as changing operating conditions of the injection molding machine 10, and various operations such as starting and stopping of automatic operations. Further, the liquid crystal display unit LCD of the operation panel 22 displays, on a display screen, a setting screen and required information such as monitoring information for the injection molding machine 10, etc. The manual input unit MDI may be constituted, for example, by a numerical key pad for input of numerical data, various function keys, and a keyboard. Further, the manual input unit MDI may include a touch panel provided on the display screen of the liquid crystal display unit LCD.

The cover member 20 is further provided with an operating device 28, which is an external device that outputs door opening commands and door closing commands for the safety door 24, responsive to operations of the operator. The operating device (first operating device) 28 is provided on a downward side of the operation panel 22. The operating device 28 includes an opening operation button 28a for opening the safety door 24, and a closing operation button 28b for closing the safety door 24. When the opening operation button 28a is operated by the operator, the operating device 28 outputs a door opening command to a later-described controller 50 (see FIG. 2), and when the closing operation button 28b is operated by the operator, the operating device 28 outputs a door closing command to the controller 50. The operating device 28, which is an external device, need not necessarily be provided on the cover member 20, and may be provided at any appropriate location or place. Further, the operation panel 22 may also function as the operating device 28, without separately providing the operating device 28.

A light curtain (presence detector) 30, which detects whether or not an operator or object (hereinafter referred to simply as an "operator") is present within a door operating space of the safety door 24, is provided in the injection molding machine 10. In this instance, the light curtain 30 is provided so as to be capable of detecting an operator or object that exists at least within an area that is opened by the opening operation of the safety door 24, from within the door operating space of the safety door 24 (an area in which the safety door 24 is operated). Since the operator extends his or her hand or the like inside of the cover member 20 through a portion that is opened by the opening operation of the safety door 24, the detection area of the light curtain 30 may include, from among the door operating space of the safety door 24, at least an area on a side which is opened by the opening operation of the safety door 24.

The light curtain 30 includes a light projection unit 30a for emitting light such as infrared rays, and a light reception unit 30b for receiving the light projected from the light projection unit 30a. The light curtain 30 is supported by the cover member 20 or by a non-illustrated support member. The light projection unit 30a is disposed above the safety door 24, and the light reception unit 30b is disposed below the safety door 24. The light projection unit 30a includes a plurality of light emitting elements (illustration omitted) disposed along the direction of operation (the left and right directions in FIG. 1) of the safety door 24. The light reception unit 30b includes a plurality of light receiving elements (illustration omitted) disposed along the direction of operation of the safety door 24, and which receive the light emitted by the plurality of light emitting elements. The light projection unit 30a and the light reception unit 30b may be provided on an entrance side of the safety door 24, or may be provided on an exit side thereof. Further, the light projection unit 30a and the light reception unit 30b may be provided both on the entrance side and on the exit side.

For example, when the operator inserts his or her hand inside the cover member 20 through an opening that is formed by opening the safety door 24, a portion of the light emitted from the plurality of light emitting elements is blocked or shaded by the hand of the operator. Therefore, one or two or more of the light receiving elements that receive light in the shaded region cannot receive such light. Accordingly, by detecting light receiving elements that do not receive light, the light curtain 30 (more specifically, the light reception unit 30b thereof) is capable of detecting that the operator is present within the door operating space of the safety door 24. The detection result from the light curtain 30 is transmitted to the controller 50.

Figure 2:
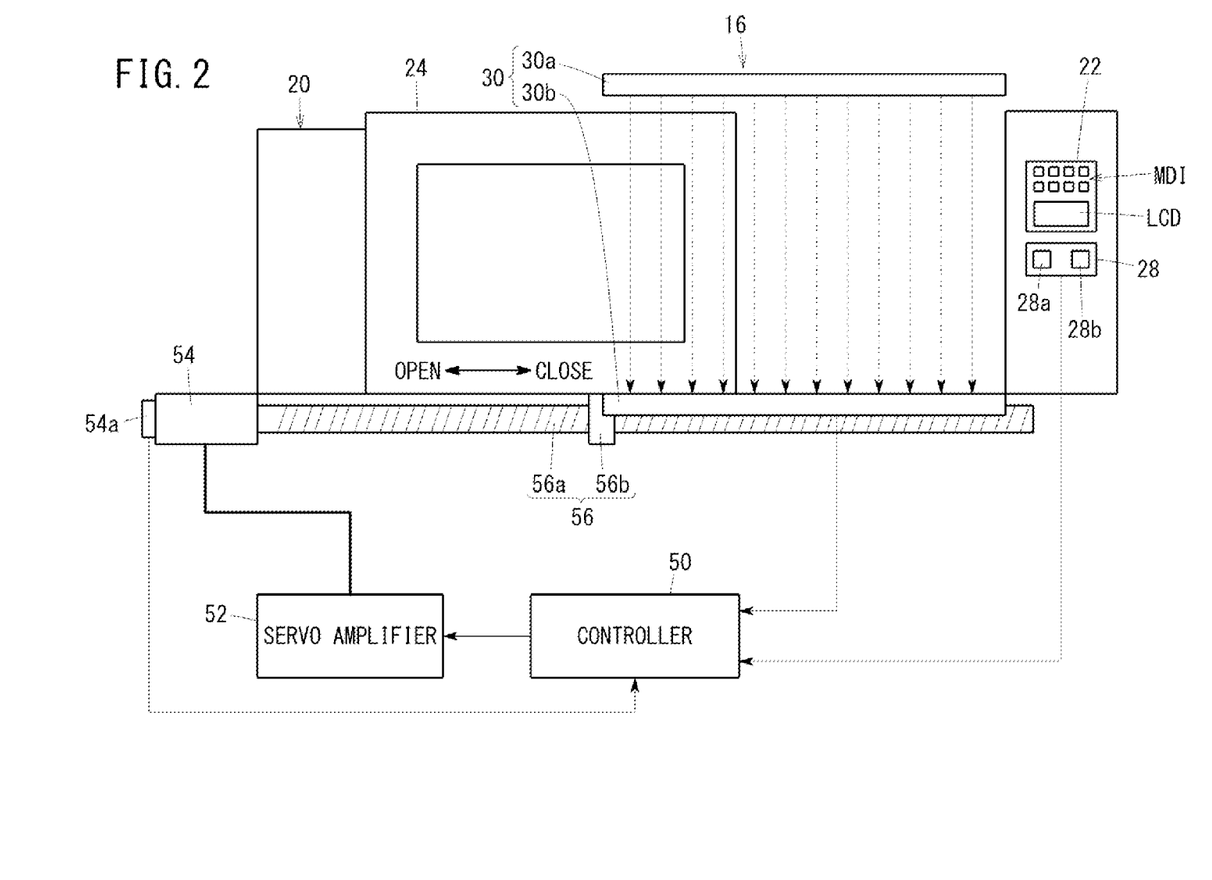
FIG. 2 is a view showing a configuration for driving a safety door of the injection molding machine shown in FIG. 1.

FIG. 2 is a view showing a configuration for driving the safety door 24 of the injection molding machine 10. The injection molding machine 10 is further equipped with the controller 50, a servo amplifier 52, a servo motor 54, and a rotational to linear motion conversion mechanism 56. The controller 50 causes the servo motor 54 to rotate by controlling the servo amplifier 52. Stated otherwise, the controller 50 controls rotation of the servo motor 54 through the servo amplifier 52. The rotational to linear motion conversion mechanism 56 converts the rotational force of the servo motor 54 into a linear motion force, whereby the safety door 24 is made to undergo linear motion.

Consequently, the safety door 24 moves in the left and right directions of FIG. 2. At least the servo motor 54 functions as a door driving unit for opening and closing the safety door 24. A position detector 54a such as an encoder or the like for detecting the rotational position of the servo motor 54 is provided in the servo motor 54. The servo motor 54 is feedback controlled based on the rotational position detected by the position detector 54a.

The rotational to linear motion conversion mechanism 56 includes a ball screw 56a, and a nut 56b that is screw-engaged with the ball screw 56a. The safety door 24 is connected to the nut 56b. Further, the ball screw 56a is connected to a rotary shaft of the servo motor 54. Consequently, when the servo motor 54 rotates, the ball screw 56a is rotated together therewith, and as a result, the nut 56b (and the safety door 24) advance and retract along the left and right directions in FIG. 2. When the servo motor 54 is rotated in a normal direction, the safety door 24 moves in a direction to open (the left direction in FIG. 2), whereas when the servo motor 54 is rotated in a reverse direction, the safety door 24 moves in a direction to close (the right direction in FIG. 2).

The controller 50 includes a computer and a storage medium in which a program is stored, and by the computer executing the program stored in the storage medium, the computer functions as the controller 50 of the present embodiment. The controller 50 controls the servo motor 54 through the servo amplifier 52, whereby the safety door 24 is controlled to open and close. By the opening operation button 28a of the operating device 28 being operated by an operator, when a door opening command is transmitted thereto from the operating device 28, the controller 50 initiates an opening operation of the safety door 24. Stated otherwise, the safety door 24 is made to move in an opening direction (the left direction in FIG. 2) from a fully closed position. Further, by the closing operation button 28b of the operating device 28 being operated by the operator, when a door closing command is transmitted thereto from the operating device 28, the controller 50 initiates a closing operation of the safety door 24. Stated otherwise, the safety door 24 is made to move in a closing direction (the right direction in FIG. 2) toward the fully closed position.

In principle, the controller 50 controls the servo motor 54 with a reference control amount, and thereby performs the closing operation of the safety door 24. According to the present description, a closing speed and a closing driving force of the safety door 24 when controlled with the reference control amount are referred to as a normal speed and a normal driving force. In addition, in the case it is detected by the light curtain 30 that the operator is present within the door operating space of the safety door 24, the controller 50 decreases the control amount applied with respect to the servo motor 54 from the reference control amount, such that the closing operation of the safety door 24 is temporarily stopped. At this time, the control amount applied with respect to the servo motor 54 is substantially zero. Further, during a time it is being detected by the light curtain 30 that the operator is present within the door operating space of the safety door 24, the controller 50 controls the servo motor 54 so as to temporarily stop the safety door 24.

Figure 3:
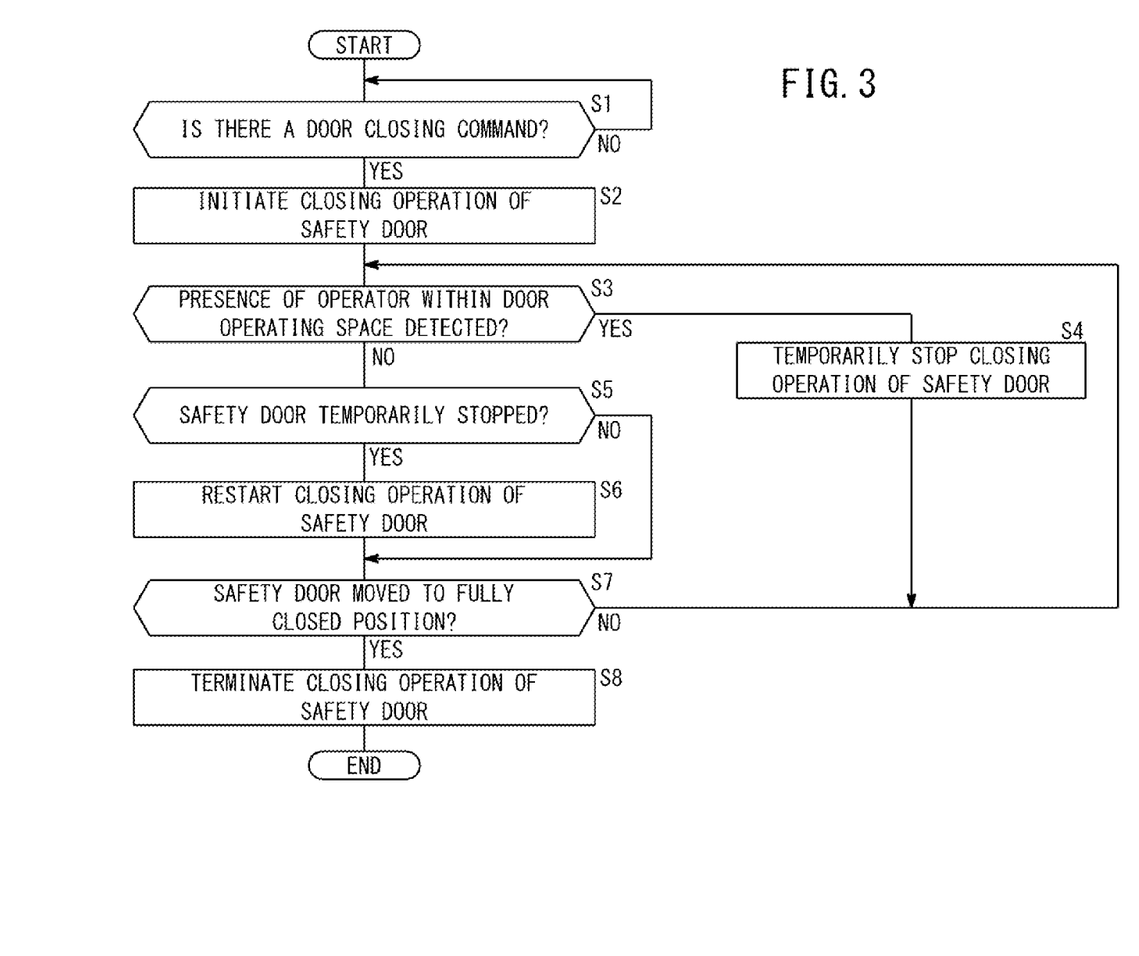
FIG. 3 is a flowchart indicating operations of a controller shown in FIG. 2.

Next, operations of the controller 50 will be described with reference to the flowchart of FIG. 3. At first, the safety door 24 is in an open state. In step S1, the controller 50 determines whether or not a door closing command has been transmitted thereto from the operating device 28 as an external device. The operating device 28 outputs the door closing command to the controller 50 when the closing operation button 28b is operated by the operator.

In step S1, if it is determined that a door closing command has not been transmitted, the routine remains at step S1 until a door closing command is transmitted. On the other hand, if it is determined in step S1 that a door closing command has been transmitted, the routine proceeds to step S2, whereupon by the controller 50 controlling the servo motor 54 through the servo amplifier 52, a closing operation of the safety door 24 is initiated. At this time, the controller 50 controls the servo motor 54 with the reference control amount. Accordingly, the safety door 24 moves in the closing direction at the normal speed and with the normal driving force.

Next, in step S3, the controller 50 determines whether or not the presence of the operator in the door operating space has been detected by the light curtain 30. The controller 50 carries out such a determination based on the detection result of the light curtain 30.

In the case it is determined in step S3 that the operator was detected to be present in the door operating space, the routine proceeds to step S4, whereupon the controller 50 decreases the control amount applied with respect to the servo motor 54 from the reference control amount (the control amount is decreased substantially to zero), so as to temporarily stop the closing operation of the safety door 24. Thereafter, the routine returns to step S3. As a result of the operation of step S4, the safety door 24 is temporarily stopped. Moreover, in the event that the safety door 24 is already temporarily stopped, the temporarily stopped condition of the safety door 24 is maintained as is, and the routine returns to step S3.

On the other hand, in the case it is not detected in step S3 that the operator is present in the door operating space, the routine proceeds to step S5, whereupon the controller 50 determines whether or not the safety door 24 is temporarily stopped. If the controller 50 determines in step S5 that the safety door 24 is being temporarily stopped, the controller 50 restores the control amount applied with respect to the servo motor 54 to its original value (the reference control amount) (step S6), and then the routine proceeds to step S7. By the process of step S6, the closing operation of the safety door 24 is restarted, and the safety door 24 moves in the closing direction at the normal speed and with the normal driving force. If it is determined in step S5 that the safety door 24 is not being temporarily stopped, the routine proceeds directly to step S7.

In step S7, the controller 50 determines whether or not the safety door 24 has been moved to the fully closed position. If it is determined in step S7 that the safety door 24 is not moved to the fully closed position, the routine returns to step S3, and the above-described process is repeated. On the other hand, if it is determined in step S7 that the safety door 24 has been moved to the fully closed position, the routine proceeds to step S8, and the controller 50 terminates the closing operation of the safety door 24.

In the foregoing manner, when it is detected by the light curtain 30 that the operator is present within the door operating space, the controller 50 temporarily stops the closing operation of the safety door 24. Thereafter, if it is detected by the light curtain 30 that the operator is not present within the door operating space, the controller 50 carries out the closing operation of the safety door 24. Consequently, it is possible to prevent in advance contact between an operator and the safety door 24.

Moreover, during the time it is detected by the light curtain 30 that the operator is present within the door operating space, in the case that a door closing command is transmitted to the controller 50 from the operating device 28 (step S1: YES), the controller 50 does not start the closing operation of the safety door 24. In this case, the controller 50 starts the closing operation of the safety door 24 from a time at which it is not detected by the light curtain 30 that the operator is present within the door operating space.

Further, according to the present embodiment, the light curtain 30 may be provided in order to enable detection of an operator existing within the entire door operating space of the safety door 24. More specifically, within the area in which the safety door 24 is operated, in addition to the region which is opened by the opening operation of the safety door 24, the light curtain 30 may also be provided in order to enable detection of an operator existing within a region in which the safety door 24 is moved by the door opening operation of the safety door 24.

MODIFIED EXAMPLES

The above-described embodiment is capable of being modified in the following ways.

Modified Example 1

Figure 4:
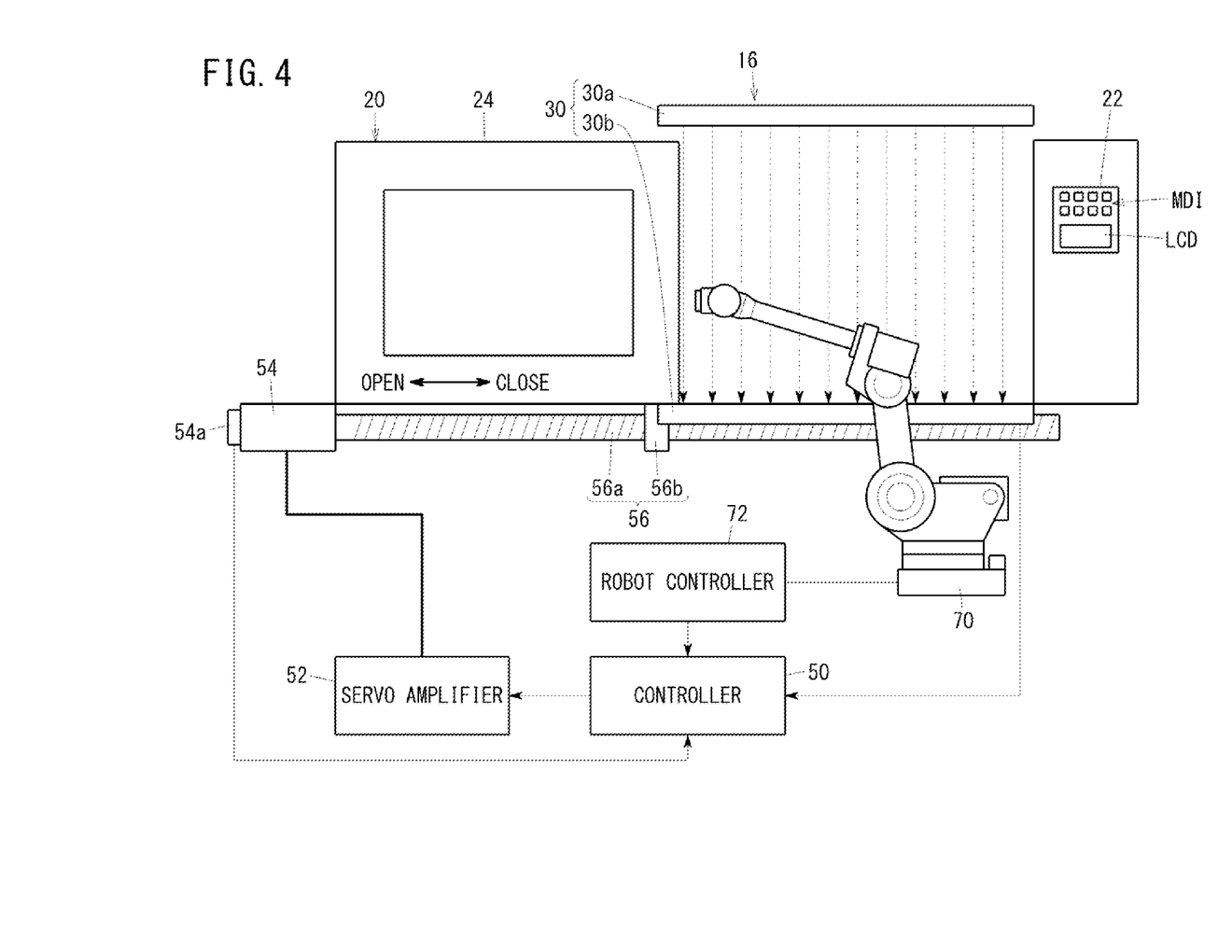
FIG. 4 is a view showing a configuration for driving a safety door of an injection molding machine according to a modified example 1, and a robot and a robot controller that controls the robot.

Although according to the above-described embodiment the door closing command is output to the controller 50 by the operating device 28 responsive to an operation from the operator, according to a modified example 1, a robot controller (external device) 72 which controls a robot 70 outputs the door closing command to the controller 50. Constituent elements which are the same as those of the above-described embodiment are denoted by the same reference characters, and description of such features is omitted.

FIG. 4 is a view showing a configuration for driving the safety door 24 of the injection molding machine 10 according to the modified example 1, along with the robot 70 and the robot controller 72 that controls the robot 70. The robot 70 is a robot that performs operations in cooperation with the injection molding machine 10, and is installed on a front side, a rear side, or an upper side of the clamping unit 16. The robot 70, for example, may serve to take out and remove a molded article from the mold of the clamping unit 16, or may serve to insert a member into the mold of the clamping unit 16 in order to carry out insert molding. Further, the robot 70 may be used to exchange the mold of the clamping unit 16. In general, a safety fence is provided to surround the robot. However, the robot 70 may be a robot that is capable of being operated in cooperation with an operator in the absence of such a safety fence.

The robot controller 72 is a controller that controls the robot 70 so that the robot 70 performs operations in cooperation with the injection molding machine 10. The safety door 24 may be opened at times that the robot 70 carries out operations. Accordingly, since there is no need for the safety door 24 to be left open when operations (operations of one cycle) of the robot 70 are completed, the robot controller 72 outputs a door closing command to the controller 50. When the door closing command is transmitted, the controller 50 initiates the closing operation of the safety door 24 as described above.

Modified Example 2

Figure 5:
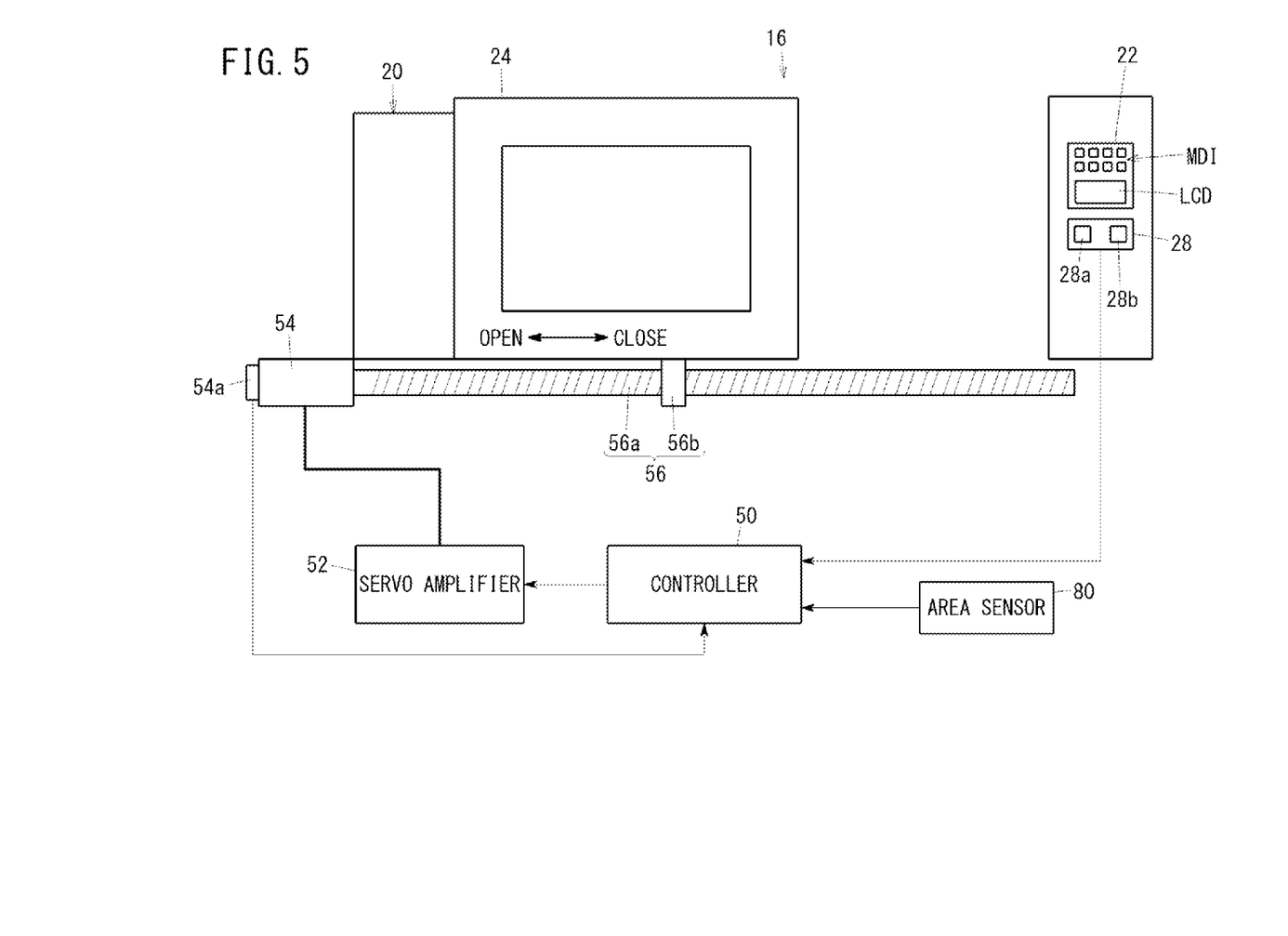
FIG. 5 is a view showing a configuration for driving a safety door of an injection molding machine according to a modified example 2.

Although according to the above-described embodiment the light curtain 30 is used as the presence detector that detects the presence of the operator, according to a modified example 2, an area sensor 80 is used as the presence detector. Constituent elements which are the same as those of the above-described embodiment are denoted by the same reference characters, and description of such features is omitted.

Figure 6:
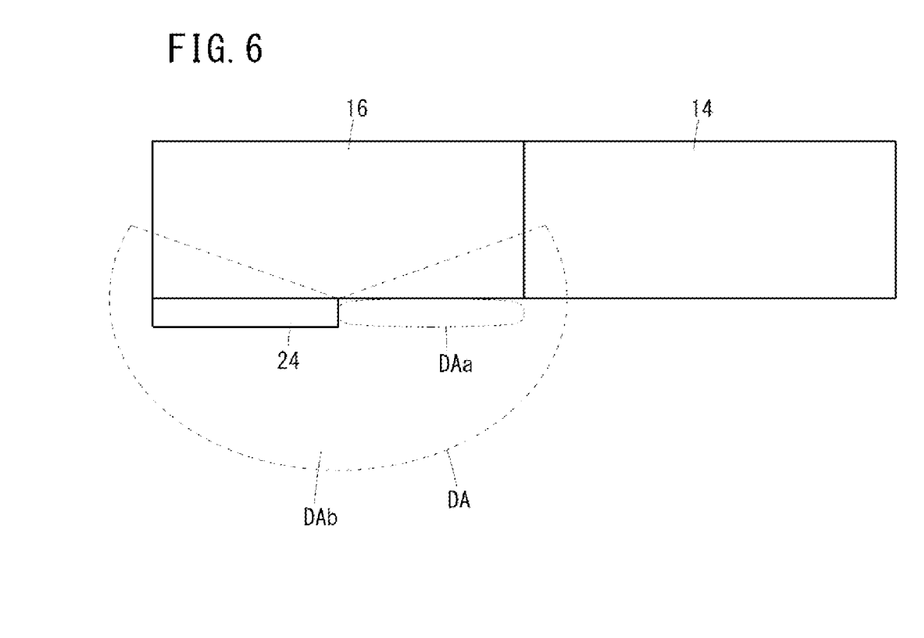
FIG. 6 is a view illustrating a detection area of an area sensor shown in FIG. 5.

FIG. 5 is a view showing a configuration for driving the safety door 24 of the injection molding machine 10 according to the modified example 2. In the modified example 2, instead of the light curtain 30, an area sensor 80 is provided. As shown in FIG. 6, the area sensor 80 makes it possible to detect whether or not an operator exists within a predetermined detection area DA (a vicinal area of the safety door 24) including the door operating space of the safety door 24. In the following description of the modified example 2, for the sake of convenience, the door operating space is represented by DAa, and within the detection area DA, a portion thereof other than the door operating space DAa is referred to as a nearby area DAb.

The area sensor 80 may be, for example, a laser scanner that detects a distance to a detected object using a TOF (time of flight) method, or may be an image capturing device that detects the distance to the detected object using a TOF (time of flight) method. The detection area DA is divided into a plurality of non-illustrated detection areas. The area sensor 80 sequentially calculates the distance to the detected object for each of the detection areas, and based on the detected distances for each of the detection areas, detects whether or not an operator is present within the vicinal area. By using such an area sensor 80, it also is possible to detect at which position the operator exists within the vicinal area. The area sensor 80 may also be an image capturing device having a so-called subject recognition function capable of recognizing the operator based on the captured image. The detection result from the area sensor 80 is transmitted to the controller 50.

During a time it is detected by the area sensor 80 that the operator is present within the door operating space DAa, the controller 50 sets the control amount applied with respect to the servo motor 54 to be lower than the reference control amount (more specifically, decreases the control amount to substantially zero), so that the closing operation of the safety door 24 is temporarily stopped. During a time it is detected by the area sensor 80 that the operator is present within the nearby area DAb, the controller 50 decreases the control amount applied with respect to the servo motor 54 from the reference control amount, and the closing operation of the safety door 24 is carried out in such a manner that at least one of the closing speed and the closing driving force of the safety door 24 is decreased.

Figure 7:
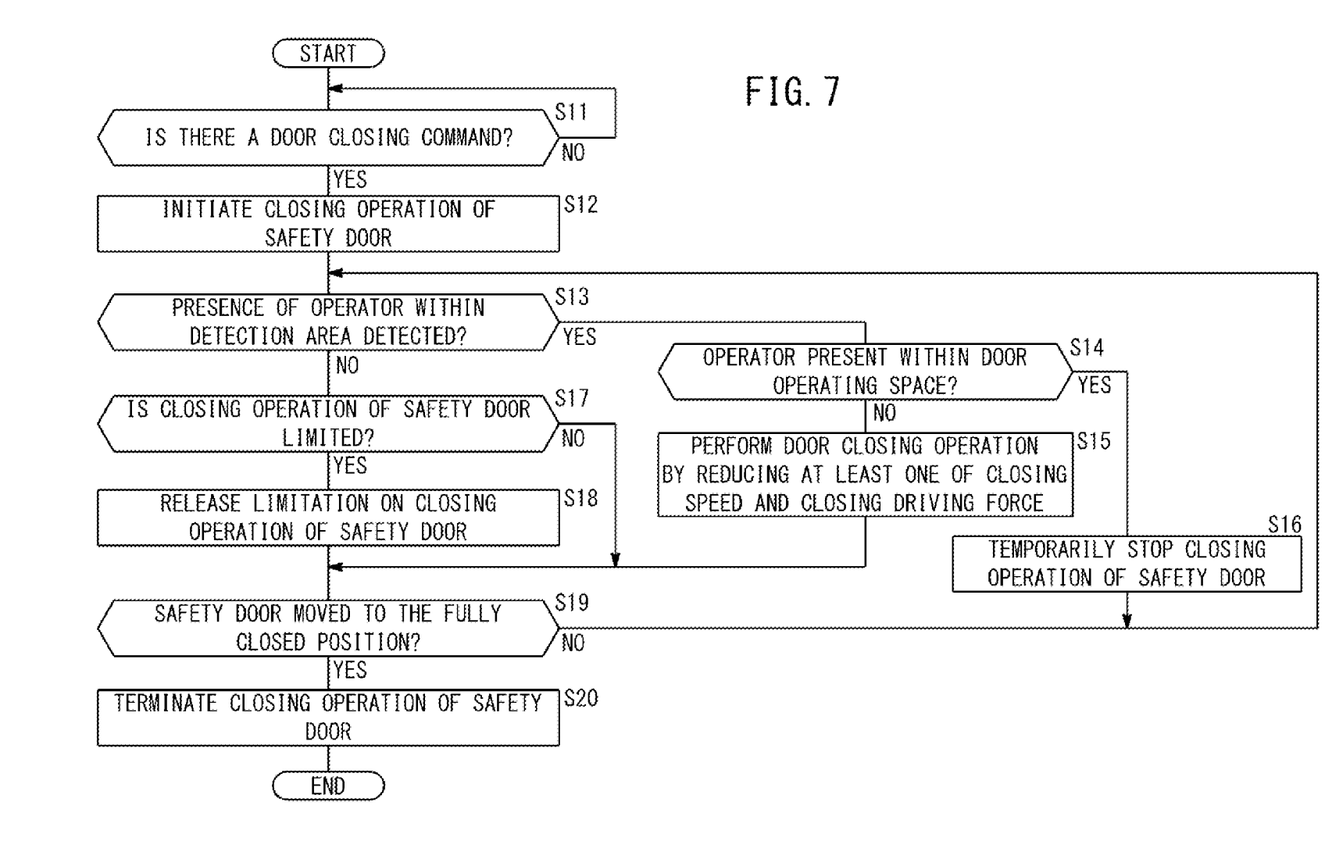
FIG. 7 is a flowchart indicating operations of a controller used in the modified example 2.

Next, operations of the controller 50 in the modified example 2 will be described with reference to the flowchart of FIG. 7. At first, the safety door 24 is in an open state. In step S11, the controller 50 determines whether or not a door closing command has been transmitted thereto. The operating device 28 outputs the door closing command to the controller 50 when the closing operation button 28*b* is operated by the operator. Moreover, in the case that the robot 70 and the robot controller 72 for controlling the robot 70 are provided as in the above-described modified example 1, the robot controller 72 may output the door closing command to the controller 50.

In step S11, if it is determined that a door closing command has not been transmitted, the routine remains at step S11 until a door closing command is transmitted. On the other hand, if it is determined in step S11 that a door closing command has been transmitted, the routine proceeds to step S12, whereupon by the controller 50 controlling the servo motor 54 through the servo amplifier 52, a closing operation of the safety door 24 is initiated. At this time, the controller 50 controls the servo motor 54 with the reference control amount. Accordingly, the safety door 24 moves in the closing direction at the normal speed and with the normal driving force.

Next, in step S13, the controller 50 determines whether or not the presence of the operator within the detection area DA has been detected by the area sensor 80. The controller 50 carries out such a determination based on the detection result of the area sensor 80.

In the case it is determined in step S13 that the operator is present in the detection area DA, the routine proceeds to step S14, whereupon the controller 50 determines whether or not the operator is present within the door operating space DAa. The controller 50 carries out such a determination based on the detection result of the area sensor 80.

If it is determined in step S14 that the operator is not present within the door operating space DAa, or in other words, that the operator is present within the nearby area DAb, the controller 50 decreases the control amount applied with respect to the servo motor 54 from the reference control amount (step S15), so as to decrease at least one of the closing speed and the closing driving force of the safety door 24, and then the routine proceeds to step S19. Consequently, in the case it is detected that the operator is present within the nearby area DAb, the safety door 24 is moved in the closing direction with a limited speed and/or a limited driving force by which the closing speed and/or the closing driving force are limited. Such a limited speed is a closing speed that is slower (lower) than the normal speed, and such a limited driving force is a closing driving force that is smaller (lower) than the normal driving force. In the case that the control amount applied with respect to the servo motor 54 has already been reduced, and the safety door 24 is being moved in the closing direction at the limited speed and/or the limited driving force, the present control amount is maintained without change, and the routine proceeds to step S19.

The controller 50 may intensify (increase) the degree of reduction in the control amount applied with respect to the servo motor 54, as the distance (shortest distance) from the door operating space DAa to the operator residing within the nearby area DAb becomes closer (shorter). Stated otherwise, as the operator is closer to the door operating space DAa, the limited speed and the limited driving force of the safety door 24 may become smaller. Further, after the safety door 24 has been temporarily stopped by the later-described process of step S16, in the event that the routine proceeds to step S15, the closing operation of the safety door 24 is restarted by the process of step S15, and at that time, the closing speed and/or the closing driving force thereof become the limited speed and/or the limited driving force.

On the other hand, in the case it is determined in step S14 that the operator is present in the door operating space DAa, the routine proceeds to step S16, whereupon the controller 50 decreases the control amount applied with respect to the servo motor 54 from the reference control amount (the control amount is decreased substantially to zero), so as to temporarily stop the closing operation of the safety door 24. Thereafter, the routine returns to step S13. As a result of the operation of step S16, the safety door 24 is temporarily stopped. Moreover, in the event that the safety door 24 is already temporarily stopped, the temporarily stopped condition of the safety door 24 is maintained as is, and the routine returns to step S13.

In the case it is determined in step S13 that the operator is not present within the detection area DA, the routine proceeds to step S17, whereupon the controller 50 determines whether or not the closing operation of the safety door 24 is being limited. In the case that the control amount applied with respect to the servo motor 54 is decreased from the reference control amount by the process of step S15 or step S16, the controller 50 determines that the closing operation of the safety door 24 is being limited.

If it is determined in step S17 that the closing operation of the safety door 24 is being limited, the routine proceeds to step S18, whereupon the controller 50 restores the control amount applied with respect to the servo motor 54 to its original value (the reference control amount), whereby the limitation on the closing operation of the safety door 24 is released, and then the routine proceeds to step S19. By the process of step S18, the safety door 24 moves in the closing direction at the normal speed and with the normal driving force. On the other hand, if it is determined in step S17 that the closing operation of the safety door 24 is not being limited, the routine proceeds directly to step S19.

Upon proceeding to step S19, the controller 50 determines whether or not the safety door 24 has been moved to the fully closed position. If it is determined in step S19 that the safety door 24 is not moved to the fully closed position, the routine returns to step S13, and the above-described process is repeated. On the other hand, if it is determined in step S19 that the safety door 24 has been moved to the fully closed position, the routine proceeds to step S20, and the controller 50 terminates the closing operation of the safety door 24.

In this manner, when it is detected by the area sensor 80 that the operator is present within the nearby area DAb, the controller 50 limits (decreases) the closing speed and the closing driving force of the safety door 24, and the closing operation of the safety door 24 is carried out. Thereafter, when the operator moves into the door operating space DAa, the controller 50 temporarily stops the closing operation of the safety door 24. Consequently, it is possible to prevent in advance contact between an operator and the safety door 24 of the injection molding machine 10. Further, when the operator who is present within the door operating space DAa moves into the nearby area DAb, the closing operation of the safety door 24 is initiated in a state in which at least one of the closing speed and the closing driving force of the safety door 24 is limited (decreased). In addition, if the operator moves outside of the detection area DA, the safety door 24 moves in the closing direction at the normal speed and with the normal driving force.

Moreover, during the time it is detected by the area sensor 80 that the operator is present within the detection area DA, in the case that a door closing command is transmitted to the controller 50 from the operating device 28 (step S11: YES), the controller 50 may limit the closing operation of the safety door 24. For example, in the case it is detected that the operator is present within the nearby area DAb, at least one of the closing speed and the closing driving force may be decreased, and the closing operation of the safety door 24 may be started. Further, if it is detected that the operator is present within the door operating space DAa, the closing operation of the safety door 24 is not started. In this case, the closing operation is started after the operator has moved outside of the door operating space DAa.

Further, although according to the modified example 2 the door closing command is output to the controller 50 by the operating device 28, in the case that the robot 70 and the robot controller 72 for controlling the robot 70 are provided as in the above-described modified example 1, the robot controller 72 may output the door closing command to the controller 50.

Modified Example 3

Figure 8:
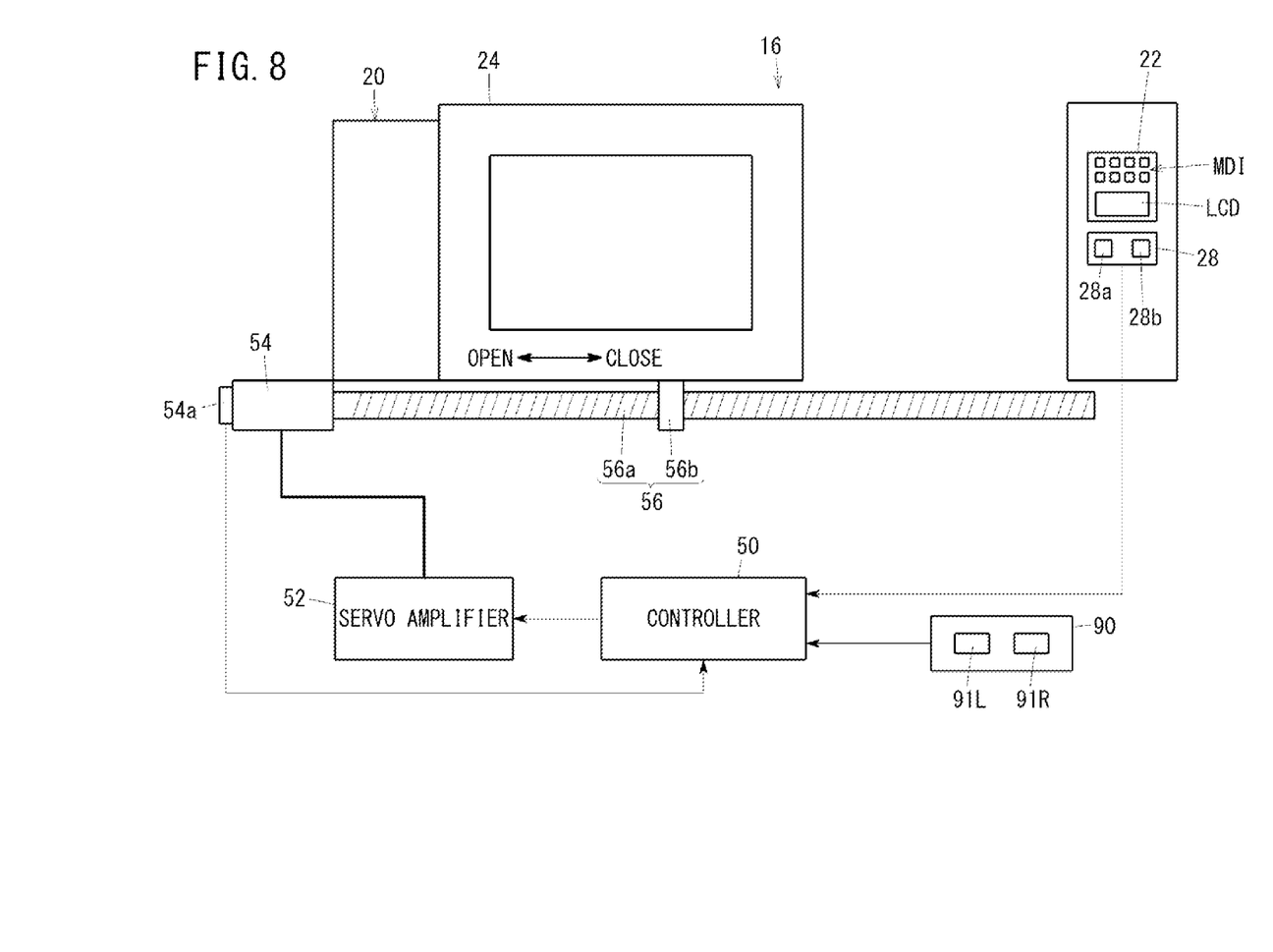
FIG. 8 is a view showing a configuration for driving a safety door of an injection molding machine according to a modified example 3.

Although according to the above-described embodiment the light curtain 30 is used as the presence detector, according to a modified example 3, an operating device (second operating device) 90 which is operated by the operator is used as the presence detector. Constituent elements which are the same as those of the above-described embodiment are denoted by the same reference characters, and description of such features is omitted.

FIG. 8 is a view showing a configuration for driving the safety door 24 of the injection molding machine 10 according to the modified example 3. In the modified example 3, instead of the light curtain 30, an operating device 90 is provided. The operating device 90 is disposed at a position separated a predetermined distance from the door operating space, and detects whether or not an operator is present within the door operation area depending on whether or not an operation is performed by the operator. The operating device 90 is equipped with a left operation button 91L and a right operation button 91R that are operated by both hands of the operator. The left operation button 91L is a button that is operated by a finger of the left hand of the operator, whereas the right operation button 91R is a button that is operated by a finger of the right hand of the operator. The left operation button 91L and the right operation button 91R are disposed in a spaced-apart manner separated by a predetermined distance, so that the buttons cannot be operated simultaneously by two fingers (for example, the thumb and the little finger) of one hand of the operator. Accordingly, if the left operation button 91L and the right operation button 91R are operated simultaneously, the operator can operate the buttons by using both hands, not one hand. When the left operation button 91L and the right operation button 91R are operated simultaneously, the operating device 90 outputs to the controller 50 a non-presence signal, which indicates that the operator is not present within the door operating space. Accordingly, the controller 50 allows the closing operation of the safety door 24 to be performed only in the case that the non-presence signal is transmitted thereto from the operating device 90, whereas the controller 50 prohibits the closing operation of the safety door 24 in the case that the non-presence signal is not transmitted. Consequently, even if the door closing command is transmitted thereto from the operating device 28, if the non-presence signal is not transmitted from the operating device 90, the controller 50 temporarily stops the closing operation of the safety door 24.

Moreover, although according to the modified example 3 the door closing command is output to the controller 50 by the operating device 28, in the case that the robot 70 and the robot controller 72 for controlling the robot 70 are provided as in the above-described modified example 1, the robot controller 72 may output the door closing command to the controller 50. Further, although the operating device 90 is configured to output the non-presence signal to the controller 50 only in the case of being operated with both hands, the operating device 90 may be configured to output the non-presence signal to the controller 50 whenever the operation buttons are operated by an operator, regardless of whether they are operated with both hands or by one hand. In this case, the operating device 90 may have only one operation button, or the left operation button 91L and the right operation button 91R may be arranged within a distance that enables simultaneous operation thereof with one hand.

Further, the operating device 90 may output a proximity signal to the controller 50 when one of the left operation button 91L and the right operation button 91R is operated. In this case, if the non-presence signal and the proximity signal are not transmitted thereto, the controller 50 may determine that the operator is present within the door operating space. In the case that the proximity signal is transmitted thereto, the controller 50 may determine that the operator is present in the vicinal area of the safety door 24 with the exception of the door operating space, and in the case that the non-presence signal is transmitted thereto, the controller 50 may determine that the operator is not present within the vicinal area of the safety door 24. Consequently, as it has been described in relation to the modified example 3, in the event that the proximity signal has been transmitted thereto, the controller 50 may carry out the closing operation of the safety door 24 by decreasing at least one of the closing speed and the closing driving force of the safety door 24, whereas if the non-presence signal and the proximity signal are not transmitted thereto, the safety door 24 may be temporarily stopped. Moreover, if the non-presence signal is transmitted thereto, the controller 50 causes the safety door 24 to move in the closing direction without imposing any limitation on the closing operation of the safety door 24.

Modified Example 4

The injection molding machine 10 may include two or more of the light curtain 30, the area sensor 80, and the operating device 90, which have been described in relation to the aforementioned embodiment.

As described above, the injection molding machine 10 is equipped with the servo motor 54 that opens and closes the safety door 24, the presence detector 30, 80, 90 that detects whether or not an operator or object is present within the door operating space of the safety door 24 or within the predetermined vicinal area DA of the safety door 24 including the door operating space, and the controller 50 that controls the servo motor 54 with a reference control amount in order to perform a closing operation of the safety door 24, and during a time it is detected by the presence detector 30, 80, 90 that an operator or object is present, causes the control amount that controls the servo motor 54 in order to perform the closing operation of the safety door 24 to decrease from the reference control amount.

In accordance with this feature, it is possible to prevent contact from occurring between the safety door 24 and an operator or object during closure of the safety door 24 of the injection molding machine 10. Consequently, safety of the operator can be enhanced, and damage to the safety door 24 or the object can be prevented.

During the time it is detected by the presence detector 30, 80, 90 that an operator or object is present, the controller 50 decreases the control amount applied with respect to the servo motor 54, so as to perform at least one from among temporarily stopping the closing operation of the safety door 24, decreasing the closing speed of the safety door 24, and decreasing the closing driving force of the safety door 24. In accordance with this feature, it is possible to prevent contact from occurring between the safety door 24 and an operator or object during closure of the safety door 24 of the injection molding machine 10.

During the time it is detected by the presence detector 30, 80, 90 that an operator or object is present within the door operating space, the controller 50 temporarily stops the closing operation of the safety door 24. In accordance with this feature, it is possible to prevent in advance contact between the safety door 24 and an operator or object during closure of the safety door 24 of the injection molding machine 10.

During a time it is detected by the presence detector 30, 80, 90 that an operator or object is present within the vicinal area DA outside of the door operating space, the controller 50 may perform the closing operation of the safety door 24 by decreasing at least one of the closing speed of the safety door 24 and the closing driving force of the safety door 24. In accordance with this feature, while preventing the closing time period of the safety door 24 from becoming long, it is possible to reliably prevent in advance contact between the safety door 24 and an operator or object.

The controller 50 may increase a degree of reduction in at least one of the closing speed of the safety door 24 and the closing driving force of the safety door 24, as the distance from the door operating space to the operator or the object residing within the vicinal area DA outside of the door operating space becomes closer. In accordance with this feature, it is possible to more reliably prevent in advance contact between the safety door 24 and an operator or object during closure of the safety door 24 of the injection molding machine 10.

The presence detector 30, 80, 90 includes at least one from among the light curtain 30 that detects whether or not an operator or object is present within the door operating space, the area sensor 80 that detects whether or not an operator or object is present within the vicinal area DA, and the operating device 90 disposed at a position distanced from the door operating space, and which detects whether or not an operator or object is present within the door operating space depending on whether or not an operation is performed by the operator. In accordance with this feature, it is possible to detect with high accuracy whether or not an operator or object exists within the door operating space of the safety door 24, or within the predetermined vicinal area DA of the safety door 24 including the door operating space.

While the invention has been particularly shown and described with reference to preferred embodiments, it will be understood that variations and modifications can be effected thereto by those skilled in the art without departing from the scope of the invention as defined by the appended claims.

What is claimed is:

1. An injection molding machine having a safety door that can be opened and closed, comprising:
   a door driving unit configured to open and close the safety door;
   a presence detector configured to detect whether or not an operator or object is present within a door operating space of the safety door, or within a predetermined vicinal area of the safety door including the door operating space; and
   a controller configured to control the door driving unit with a reference control amount in order to perform a closing operation of the safety door,
   wherein during a time it is detected by the presence detector that an operator or object is present within the vicinal area outside of the door operating space, the controller causes a control amount that controls the door driving unit to decrease from the reference control amount and performs the closing operation of the safety door, and
   during a time it is detected by the presence detector that an operator or object is present within the door operating space, the controller temporarily stops the closing operation of the safety door.

2. The injection molding machine according to claim 1, wherein, during a time it is detected by the presence detector that an operator or object is present within the vicinal area outside of the door operating space, the controller performs the closing operation of the safety door by decreasing at least one of the closing speed of the safety door and the closing driving force of the safety door.

3. The injection molding machine according to claim 2, wherein the controller increases a degree of reduction in at least one of the closing speed of the safety door and the closing driving force of the safety door, as a distance from the door operating space to the operator or the object residing within the vicinal area outside of the door operating space becomes shorter.

4. The injection molding machine according to claim 1, wherein the controller initiates the closing operation of the safety door in a case that a door closing command is transmitted thereto from an external device.

5. The injection molding machine according to claim 4, wherein the external device is a first operating device configured to output the door closing command in accordance with an operation of the operator, or a robot controller configured to control a robot configured to operate in cooperation with the injection molding machine.

6. The injection molding machine according to claim 1, wherein the presence detector includes at least one from among a light curtain configured to detect whether or not an operator or object is present within the door operating space, an area sensor configured to detect whether or not an operator or object is present within the vicinal area, and a second operating device disposed at a position distanced from the door operating space, and configured to detect whether or not an operator or object is present within the door operating space depending on whether or not an operation is performed by an operator.

7. The injection molding machine according to claim 6, wherein the second operating device detects that an operator or object is not present within the door operating space, in an event that the second operating device is operated with both hands simultaneously by an operator.

\* \* \* \* \*